United States Patent [19]

Levasseur

[11] Patent Number: 4,692,167
[45] Date of Patent: Sep. 8, 1987

[54] APPARATUS FOR PROCESSING SOLID WASTES TO PRODUCE A FUEL

[75] Inventor: Jean-Pierre Levasseur, St Germain en Laye, France

[73] Assignee: Omnium de Traitements et de Valorisation (O.T.V.), Courbevoie, France

[21] Appl. No.: 824,317

[22] Filed: Jan. 31, 1986

[30] Foreign Application Priority Data

Feb. 13, 1985 [FR] France .............................. 85 02032

[51] Int. Cl.⁴ .............................................. C10L 5/46
[52] U.S. Cl. .......................................... 44/2; 264/37; 264/140; 425/3
[58] Field of Search ....................... 425/1, 3, 237, 308; 55/459 R, 345; 264/37, 109, 122, 138, 140; 44/1 R, 1 D, 2, 10 R, 10 B, 10 E, 10 F, 10 G, 11

[56] References Cited

U.S. PATENT DOCUMENTS

| | | | |
|---|---|---|---|
| 3,961,913 | 6/1976 | Brenneman et al. | 44/1 D |
| 4,008,053 | 2/1977 | Brenneman et al. | 44/1 D |
| 4,026,678 | 5/1977 | Livingston | 44/1 D |
| 4,063,903 | 12/1977 | Beningson et al. | 44/1 D X |
| 4,142,941 | 3/1979 | Weber et al. | 44/10 E X |
| 4,229,183 | 10/1980 | Eneroth et al. | 44/1 D |
| 4,363,636 | 12/1982 | Bouvet et al. | 44/1 D X |
| 4,398,917 | 8/1983 | Reilly | 44/10 B |
| 4,561,860 | 12/1985 | Gulley et al. | 44/10 E X |

FOREIGN PATENT DOCUMENTS 2322660 4/1977 France .
2487221 1/1982 France .................................. 44/1 D

*Primary Examiner*—Richard L. Chiesa
*Attorney, Agent, or Firm*—Browdy and Neimark

[57] ABSTRACT

An apparatus for processing of residential or industrial solid wastes, including first grinding means, magnetic separation means, first screening means, whose screenings are directed to second grinding means, drying means comprising a hot air generator, gravity separation means, cyclone separation means, second screening means, and press granulating means.

The apparatus is used for production of solid fuels in granules, whose net calorific value can be modified by causing the mesh size of the first and second screening means to vary.

12 Claims, 2 Drawing Figures

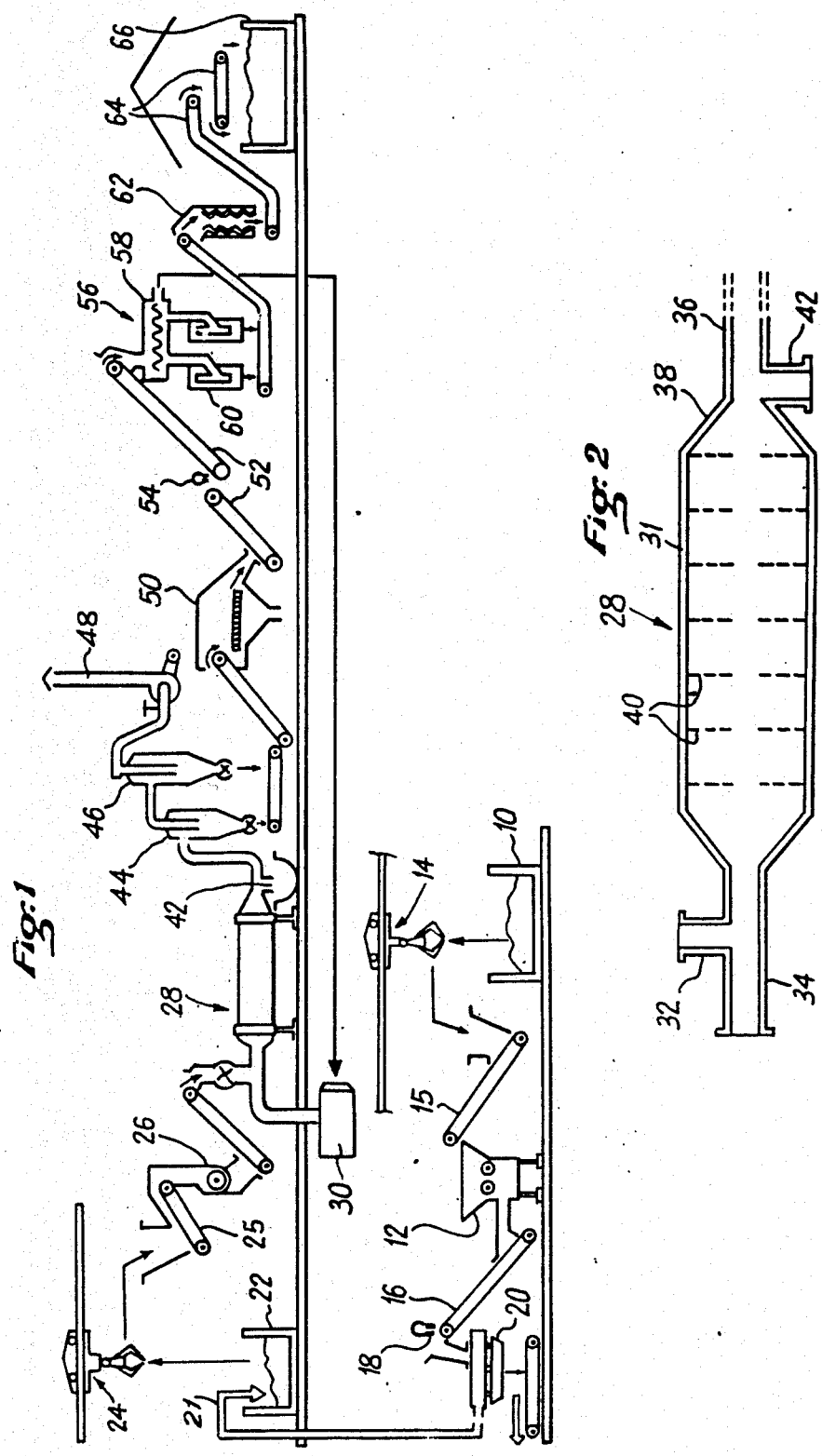

APPARATUS FOR PROCESSING SOLID WASTES TO PRODUCE A FUEL

FIELD OF THE INVENTION

This invention relates to an apparatus and process for processing of solid wastes, such as residential wastes, industrial wastes and the like, to produce a storable solid fuel. It relates more particularly to an apparatus and a process aimed at producing a solid fuel with preset characteristics from wastes freed of their fermentable organic fraction.

BACKGROUND OF THE INVENTION

There are already known in the field numerous apparatus for processing wastes, for example, of the residential waste type, to obtain a solid fuel.

There are already known in particular, as disclosed in French Pat. Nos. 2 265 457 and 2 322 660, processing apparatus in which means are provided to subject the wastes to the action of an acid such as an inorganic acid. However, this type of apparatus is both complex and costly.

Further, there is shown in French Pat. No. 2 487 221, an apparatus for processing residential wastes to produce fuel agglomerates and a compost in which a ventilation separation is performed with output gases from a cyclone separator, the solid fraction availale at the output of this separator being subjected to screening followed by shredding.

SUMMARY OF THE INVENTION

This invention aims at simplifying such a processing without compromising the quality of the resulting solid fuel, and at proposing a processing apparatus in which specific means are closely combined to assure drying simply and effectively, and separation of inorganic heavies and fines, the product delivered by said means being advantageously suitable for shaping into granules or other agglomerates, without additional grinding.

Another object of the invention is to make it possible in a simple way at this stage to vary the net calorific value of the resulting fuel.

For this purpose, this invention relates to an apparatus for obtaining a solid fuel from residential wastes or the like, characterized in that it comprises, in combination, and successively from upstream to downstream:

(a) first grinding means to reduce the particle size of the initial wastes;

(b) magnetic separation means to eliminate ferrous metals;

(c) first screening means to separate smaller-sized fermentable organic materials from the rest of the wastes, or combustible fraction, able to be transformed into fuel;

(d) second grinding means designed to reduce the particle size of the fuel fraction still further;

(e) pneumatic drying means designed to reduce the water content of the fuel fraction and outputting a gas stream charged with said fuel fraction;

(f) gravity separation means designed to separate from the gas stream the heavy products contained in the fuel fraction;

(g) cyclone separation means designed to separate from the gas stream the fuel fraction freed of said heavy products;

(h) second screening means designed to eliminate the inorganic fines having a high ash content; and (i) press granulating means designed to transform the fuel fraction on coming from the second screening means into fuel granules;

DETAILED DESCRIPTION OF THE INVENTION

The net calorific value of the resulting fuel granules can be modified to meet fuel requirements by varying the mesh sizes of the first and second screening means.

DESCRIPTION OF THE DRAWINGS

The invention will be better understood from reading the following description of a preferred embodiment of the latter, given by way of example and made with reference to the accompanying drawing, in which:

FIG. 1 is a diagrammatic side view in partial section of a processing apparatus according to the present invention, and FIG. 2 is a detailed view in section of a part of the apparatus of FIG. 1.

With reference to the drawings, raw residential wastes contained in bulk in a hopper 10 are brought into a grinder 12, in the present case with a grappling transfer mechanism 14 and a conveyor 15. Grinder 12, which suitably has a shredding capability, is designed to shred the plastic bags in which residual wastes are most often collected, and to give said wastes a relatively fine texture suitable for their further processing. In particular, and as will be seen in more in detail below, such a grinding will give the ground organic materials a texture that will promote their fermentation (composting), and to the fuel fraction a particle size that will promote its transformation into fuel.

After their passage in grinder 12, the wastes are routed, in the present case by a belt conveyor 16 to a standard magnetic separator, diagrammatically indicated as 18, which is designed to assure the elimination of ferrous metals. Actually, this type of material is, of course, unsuitable both for composting and for obtaining fuel. The metals recovered at the output of separator 18 can be recycled, as applicable.

The available ground material on coming from magnetic separator 18 and freed of ferrous metals is then subjected to a screening in a screen 20. The object of this screening is to separate the material into a fermentable organic fraction and a fuel fraction. It should be noted here that such a separation is made possible by screening because the fuel products, after grinding in 12, prove to exhibit a considerably coarser particle size than that of the fermentable organic materials. Thus, the fuel products are available in the form of screenings, while the fermentable organic materials, which are finer, are recovered after having gone through the meshes of screen 20. By way of illustration, a mesh size of screen 20 between 10 and 25 mm has proven satisfactory.

After this screening stage, the fermentable organic materials can be dumped or processed by composting, in a standard way.

The screenings which, as has been said, are able to be converted into fuel, are then subjected to fuel production process itself.

It should be noted that at the screening stage in 20, there is a possibility of adjustment, i.e., the capability of favoring one or other of said fractions. Thus, by reducing the mesh size of screen 20, the amount of fuel screenings is increased while reducing the amount of fermentable material, which makes it possible to obtain a larger amount of fuel from residential wastes. On the other hand, by increasing the mesh size of screen 20, the amount of fermentable organic materials is increased, while reducing the amount of fuel product.

However, it will be noted that, regardless of what happens, undesirable materials for fuel production, such as glass, porcelain, etc., are ground in grinder 12 to be eliminated with the fermentable fraction in screen 20. Thus, it is possible to increase the fuel fraction without, however, increasing in it the presence of such "parasite" materials.

The fuel production process itself is described in detail below.

The fraction with high net calorific value provided at the output of screen 20 in the form of screenings, as a result of the physical processing described above, is brought by means not shown and along arrow 21 into a surge hopper 22; this latter, of course, gives the installation a greater flexibility in use.

The materials contained in hopper 22 are brought, in the present example, by a grapple 24 or the like and a conveyor 25 to a shredder grinder 26. The object of the grinding and shredding operation performed in 26 is to reduce the particle size of the product, particularly textile materials that it contains, often left intact by the preprocessing described, to facilitate its later drying, its transport all along the processing line, and its granulation at the end of processing, as will be seen below. Tests have shown that a particle size on the order of 30 to 50 mm is satisfactory for the processing sequence.

After shredding and grinding in 26, the product is dried in a drying unit 28. Actually, it has been found that at this processing stage, the product intended to be transformed into solid fuel has a water content most often between 25 and 40%. Thus, by eliminating at least a part of this water by drying, to bring it to proportions less than 15%, there are obtained a notable increase in the net calorific value, a better mechanical strength of the fuel product once ground as described below at the end of the processing, as well as a possibility of storage of the product by minimizing the risks of variations of the latter, particularly by fermentation.

In the present embodiment, drying unit 28 is of the pneumatic type. More specifically, the product provided at the output of shredder grinder 26 and routed to the input of dryer 28 is transported in this latter by a drying fluid. It can be noted here that the prior grinding of the product in 26 promotes its transport by such a drying liquid.

This drying fluid, in the present embodiment, consists of inert hot gases at a temperature on the order of 500° to 600° C., supplied by a generator indicated overall as 30. As will be seen more in detail below, these hot gases are obtained by combustion of a part of the fuel produced in the present installation.

As FIG. 2 shows more in detail, pneumatic dryer 28 is in the form of a horizontal cylindrical housing 31 provided at its opposite ends, respectively, with an input 32 for the product to be dried, a coaxial hot gas input 34, and a coaxial output 36 located at the free end of a narrowing 38. On the inside of housing 31 are formed radial baffles 40 forming a single central passage, in a standard way.

On coming from housing 31, the product is in the form of a solid phase in suspension in a gas phase. The necessary separation of these two phases is performed as follows. First, at the lowest point of the product output, i.e., as shown by FIG. 2, in the lower wall of output 36, sealing device such as isolation trap 42 or equivalent is located. Isolation trap 42 is designed to extract by gravity at this site the heavy elements unsuited for fuel production, such as nonferrous metals (not eliminated by the magnetic separator mentioned above), leather, rubber, etc. Actually, it is found that this type of product, because of its density, cannot be pneumatically entrained by the hot gases, which is used to perform the separation. In an experimental installation it was found that more generally all products of a density greater than 0.6 were evacuated by isolation trap 42.

After this stage of separation of the heavies by isolation trap 42, the hot gases routing the rest of the fuel product are introduced into a standard cyclone separator 44, at the lower end of which the dry product is recovered, as said above, free of heavy bodies.

The hot gases, recovered at the top of cyclone separator 44, are introduced into a dust removal unit 46, for example of the multicyclone type, to be rejected into the atmosphere (by a stack indicated as 48), with or without additional processing, in compliance with existing standards and regulations, or also for an optional recycling.

The dry product available at the output of separator 44 and of dust remover 46 is then subjected to a fine screening in a screen 50. The object of this screening is to eliminate the last inorganic fines with a high ash content, which are, of course, undesirable because they are inert and are still in the product.

Such a fine screening at this stage of processing offers the following advantages: the product to be screened is in the dry state at this stage, which particularly facilitates its screening; as already said, the ash content is advantageously lowered; and finally, it offers the possibility of adjustment of the net calorific value of the final fuel. Actually, if the mesh size of the screen is made to vary, it is possible to obtain as output (the waste side of screening) a more or less pure product. More precisely, the greater the proportion of inorganic fines eliminated, the higher the net calorific value of the fuel, and vice versa.

Thus, tests have shown that it was possible, with the installation of this invention, to obtain fuels with a net calorific value varying between 3600 and 5000 kcal/kg, depending on the above-mentioned adjustment.

In this embodiment, but optionally, on coming from screen 50 the product, at an intermediate point of a conveyor 52, is subjected to an additional separation in a magnetic separator, indicated diagrammatically as 54, to eliminate the last particles of ferrous metals that may have escaped magnetic separator 18 at the beginning of the processing.

It can be noted that the fuel used in generator 30 to obtain hot drying gases can advantageously consist of a small part of the product taken from various sites in the line, by adapting the hot gas generator to the nature of the product.

The rest of the product is delivered, at the output end of conveyor 52, to an input of a granulating unit, indicated overall as 56. First of all, the unit comprises a mixer, indicated diagrammatically as 58, in which the product is initially homogenized. Such a mixer will also be useful in the optional case where another fuel, such as wood, charcoal, plants in the dry state, is added to the fuel product to be granulated, which has been obtained from residual type wastes in the way described above. It should be noted that the consistency of the fuel product at this processing stage advantageously allows such a mixing with this other fuel. Finally, the object of mixer 58 is to perform the distribution of the product on associated granulating presses, indicated as 60. Preferably, presses 60 are of the roller or die type, standardly used in granulating plant or other products.

On coming from the presses, the granules, still relatively high temperature, are cooled in the present case by going through an air cooler 62. The hot air recovered in this cooler, if necessary, can be recycled to generator 30 to improve its efficiency. Also, the fines recovered at the cooler can be recycled to mixer 58.

The granules coming from cooler 62 can be subjected to a sieving (not shown) to eliminate the last fines, which will also be recycled to mixer 58, before being deposited in a storage hopper 66 by standard conveyor means.

The apparatus according to the present embodiment of the invention was tested and provided the following results: for 100 tons of standard residential wastes at the start there was obtained 28 tons of solid fuel granules of an apparent density on the order of 600 kg/M$_3$, with a moisture content less than 10%, an ash content on the order of 18 to 20%, with a net calorific value between 3600 and 3800 kcal/kg. The fuel product was odorless, not fermentable, free of pathogenic germs, and its storage proved to be quite easy (simply protection from water).

Further, by increasing the mesh size, particularly in second screen 50, there was obtained, still for 100 tons of wastes at the start, 20 tons of granules of an apparent density on the order of 600 kg/M$_3$ (unchanged), with a moisture content less than 10% (also unchanged), but an ash content on the order of 15 to 18%, with a considerably increased net calorific value between 4600 and 4800 kcal/kg.

Of course, this invention is not limited to the embodiment described, but includes any variant or modification that a person skilled in the art can bring thereto.

What is claimed is:

1. Apparatus for obtaining a solid fuel from residential, industrial or similar types of wastes, comprising in combination, and successively from upstream to downstream:
   (a) first grinding means to reduce the particle size of the initial wastes;
   (b) magnetic separation means to eliminate ferrous metals;
   (c) first screening means to separate smaller-sized fermentable organic materials from the rest of the wastes, or combustible fraction, able to be transformed into fuel;
   (d) second grinding means designed to reduce the particle size of the fuel fraction still further;
   (e) pneumatic drying means designed to reduce the water content of the fuel fraction and outputting a gas stream charged with said fuel fraction;
   (f) gravity separation means designed to separate from the gas stream the heavy products contained in the fuel fraction;
   (g) cyclone separation means designed to separate from the gas stream the fuel fraction freed of said heavy products;
   (h) second screening means designed to eliminate the inorganic fines having a high ash content; and
   (i) press granulating means designed to transform the fuel fraction coming from the second screening means into fuel granules;
   the mesh sizes of the first and second screening means being adjustable.

2. The apparatus of claim 1, wherein the pneumatic drying means receive at an input not drying gases supplied by a generator fed by a part of the fuel available downstream from the drying means.

3. The apparatus of claim 2 wherein the gravity separation means comprise an isolation trap provided in the lower wall of an output duct of a pneumatic drying means.

4. The apparatus of claim 2 including air cooling means at the output of the granulating means.

5. The apparatus of claim 2, wherein the temperature of the hot gases supplied by generator is between 500° and 600° C.

6. The apparatus of claim 5 wherein the gravity separation means comprise an isolation trap provided in the lower wall of an output duct of a pneumatic drying means.

7. The apparatus of claim 5 including air cooling means at the output of the granulating means.

8. The apparatus of claim 1, wherein the gravity separation means comprise an isolation trap provided in the lower wall of an output duct of a pneumatic drying means.

9. The apparatus of claim 8 including air cooling means at the output of the granulating means.

10. The apparatus of claim 1, further including air cooling means at the output of the granulating means.

11. The apparatus of claim 10, wherein the hot air available at the output of the cooling means is recycled to the drying means.

12. The apparatus as in claim 1, wherein the cyclone separation means comprise a dust removal unit.

* * * * *